United States Patent
Sheahan

(10) Patent No.: US 9,520,821 B1
(45) Date of Patent: Dec. 13, 2016

(54) SYSTEM AND METHOD FOR OPTIMIZING FLUX REGULATION IN ELECTRIC MOTORS

(71) Applicant: Nidec Motor Corporation, St. Louis, MO (US)

(72) Inventor: Thomas J. Sheahan, Cary, IL (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

(21) Appl. No.: 14/830,583

(22) Filed: Aug. 19, 2015

(51) Int. Cl.
*H02K 7/14* (2006.01)
*H02P 23/14* (2006.01)

(52) U.S. Cl.
CPC .................................... *H02P 23/14* (2013.01)

(58) Field of Classification Search
CPC .......... H02P 6/08; H02P 21/141; H02P 23/14; H02P 21/26; H02P 21/02; H02P 21/14; H02P 21/20
USPC ...... 318/3, 11, 772, 799, 805, 807, 432, 434
See application file for complete search history.

(56) References Cited

U.S. PATENT DOCUMENTS

| | | | | |
|---|---|---|---|---|
| 6,014,006 A * | 1/2000 | Stuntz | ..................... | H02P 21/13 318/799 |
| 6,326,762 B1 * | 12/2001 | Jiang | ..................... | H02P 21/36 318/799 |
| 7,560,895 B2 * | 7/2009 | Arnet | ..................... | H02P 21/09 318/723 |
| 7,847,501 B2 * | 12/2010 | Baglino | ............. | B60L 11/1803 318/432 |
| 7,960,928 B2 * | 6/2011 | Tang | ..................... | B60L 15/025 318/400.02 |

\* cited by examiner

*Primary Examiner* — Bentsu Ro
*Assistant Examiner* — Thai Dinh
(74) *Attorney, Agent, or Firm* — Hovey Williams LLP

(57) ABSTRACT

A system and method for dynamically optimizing flux levels in electric motors based on estimated torque. Motor parameters and motor equations are used to estimate operating characteristics and to set current and voltage limits which define an optimal flux operating range for a given speed and torque of the motor. A slope of a linear flux gain is determined within the defined operating range at different speeds of the motor. The determined slopes for the different speeds are saved in a memory element. A control element determines and achieves an optimal flux level for the motor by accessing the table to identify a specific slope which corresponds to an actual speed of the motor, multiplying the slope by the estimated torque and adding an offset value to determine a phase current component value associated with the optimal flux level, and applying the determined phase current component value to the motor.

20 Claims, 8 Drawing Sheets

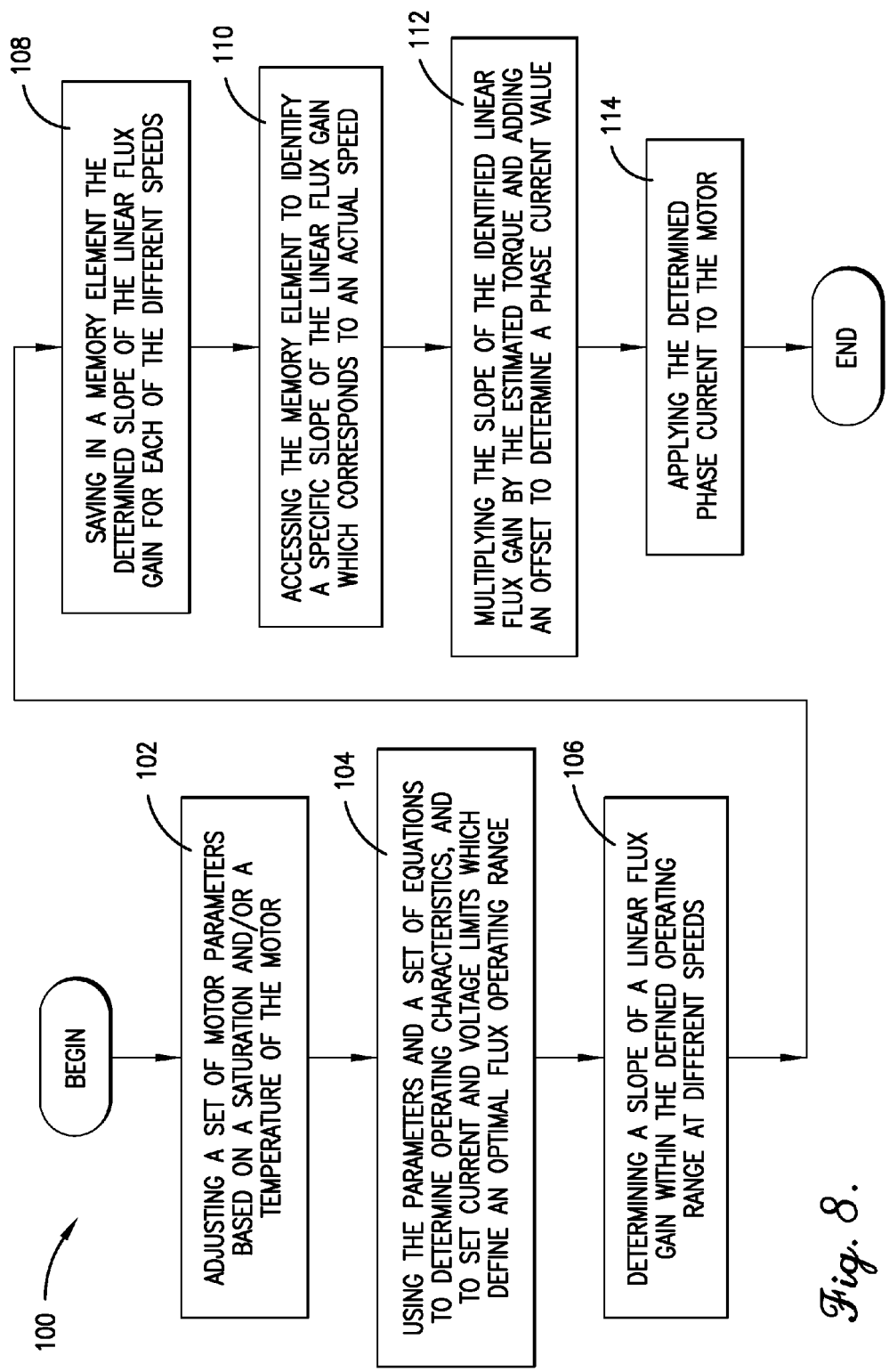

SYSTEM AND METHOD FOR OPTIMIZING FLUX REGULATION IN ELECTRIC MOTORS

FIELD

The present invention relates to systems and methods for controlling the operation of electric motors, and, more particularly, to a system and method for optimizing flux regulation in electric motors.

BACKGROUND

Electric induction motors are normally designed to provide rated load at rated speed. Simple control systems use voltage/frequency (V/F) curves that generate constant torque up to the knee of the curve. However, most such V/F curves are each tuned to a specific load and constant flux, yet many electric motors experience varying loads. If the load is less than the rated torque, excess flux is delivered resulting in less efficiency. Furthermore, electric motor systems designed for maximum load draw more power and generate more heat which reduces the reliability of those systems.

Optimal flux regulation provides a method of controlling efficiency. Normally the best efficiency is achieved by balancing copper and core power losses. When both reach the same power levels, the electric motor is generally running at the most efficient operating point. However, this is not the case at low torque loads. One method of controlling efficiency monitors estimated real power and adjusts the flux until the real power is at the lowest point. A problem occurs if the operating range is small due to current and voltage limits. Also, the starting flux point must be within the operating range or the electric motor will not generate the necessary torque. The current and voltage limit is set by the control hardware. The current limit is based on the control's inverter capability, and exceeding the current limit may damage the inverter. The voltage limit is based on the direct current (DC) supply. Controls with a power factor control (PFC) will maintain a relatively consistent DC voltage, while controls without a PFC will rely on the alternating current (AC) voltage supplying the control and must cut off at a predetermined low DC voltage level. Many controls now use vector control that separates the phase current (I) into two vector current components: The $I_d$ current vector regulates the flux, while the $I_q$ current regulates the torque.

This background discussion is intended to provide information related to the present invention which is not necessarily prior art.

SUMMARY

Embodiments of the present invention solve the above-described and other problems and limitations by providing a system and method for dynamically optimizing flux levels in electric motors based on estimated torque, and thereby improving efficiency, decreasing operating temperature, and increasing reliability.

In a first embodiment, a method of the present invention may proceed substantially as follows. A set of motor parameters and a set of motor equations may be used to estimate a slip, a stator frequency, a torque, and a power loss and to set a current limit and a voltage limit which define an optimal flux operating range for a given speed and torque of the motor. A slope of a linear flux gain may be determined within the optimal flux operating range at a plurality of different speeds of the motor. The slope of the linear flux gain for each different speed may be saved in an electronic memory element. An electronic control element may determine an optimal flux level for the motor by accessing the table stored in the memory element to identify a specific slope of the linear flux gain which corresponds to an actual speed of the motor, multiplying the slope of the linear flux gain by the estimated torque and adding an offset value to determine a phase current component value associated with the optimal flux level, and applying the determined phase current component value to the motor.

In a second embodiment, a system of the present invention may broadly comprise an electric motor and a motor control subsystem. The motor may have a shaft and may be configured to create a torque on the shaft to drive a load. The motor control subsystem may be configured to control operation of the motor, and may include an electronic memory element and an electronic control element. The memory element may contain a table of slopes of a linear flux gain for a plurality of different speeds. The table may be created by using a set of motor parameters and a set of motor equations to estimate a slip, a stator frequency, a torque, and a power loss and to set a current limit and a voltage limit which define an optimal flux operating range for a given speed and torque of the electric motor, determining a slope of a linear flux gain within the optimal flux operating range at a plurality of different speeds of the electric motor, and saving in the memory element the slope of the linear flux gain for each different speed. The control element may be in communication with the memory element and configured to determine and achieve an optimal flux level for the motor by accessing the memory element to identify a specific slope of the linear flux gain which corresponds to an actual speed of the motor, multiplying the slope of the linear flux gain by the estimated torque and adding an offset value to determine a phase current component value associated with the optimal flux level, and applying the determined phase current component value to the motor.

Various implementations of each of the foregoing embodiments may include any one or more of the following additional features. The motor may be a variable speed, alternating current induction motor. The load may be selected from among fans, pumps, blowers, rotating drums, components of clothes washers or clothes dryers, components of ovens, components of heating and air-conditioning units, and components of residential or commercial machines. The current limit may correspond to a lower flux limit based on a torque load level for a given speed of the motor, and the voltage limit corresponds to an upper flux limit based on the torque load level which results in a lower phase current torque component. The motor equations may include a slip equation, a voltage equation, a torque equation, and a power equation. The offset value may be a common offset value for the plurality of different speeds and is based on the phase current at a lowest torque point. The optimal flux may be determined by the torque resulting in a lowest power level. The method and/or system may further include adjusting the set of motor parameters based on a saturation of the motor and/or on a temperature of the motor.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 8 is a flowchart of an embodiment of a method of the present invention.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Figure 1:
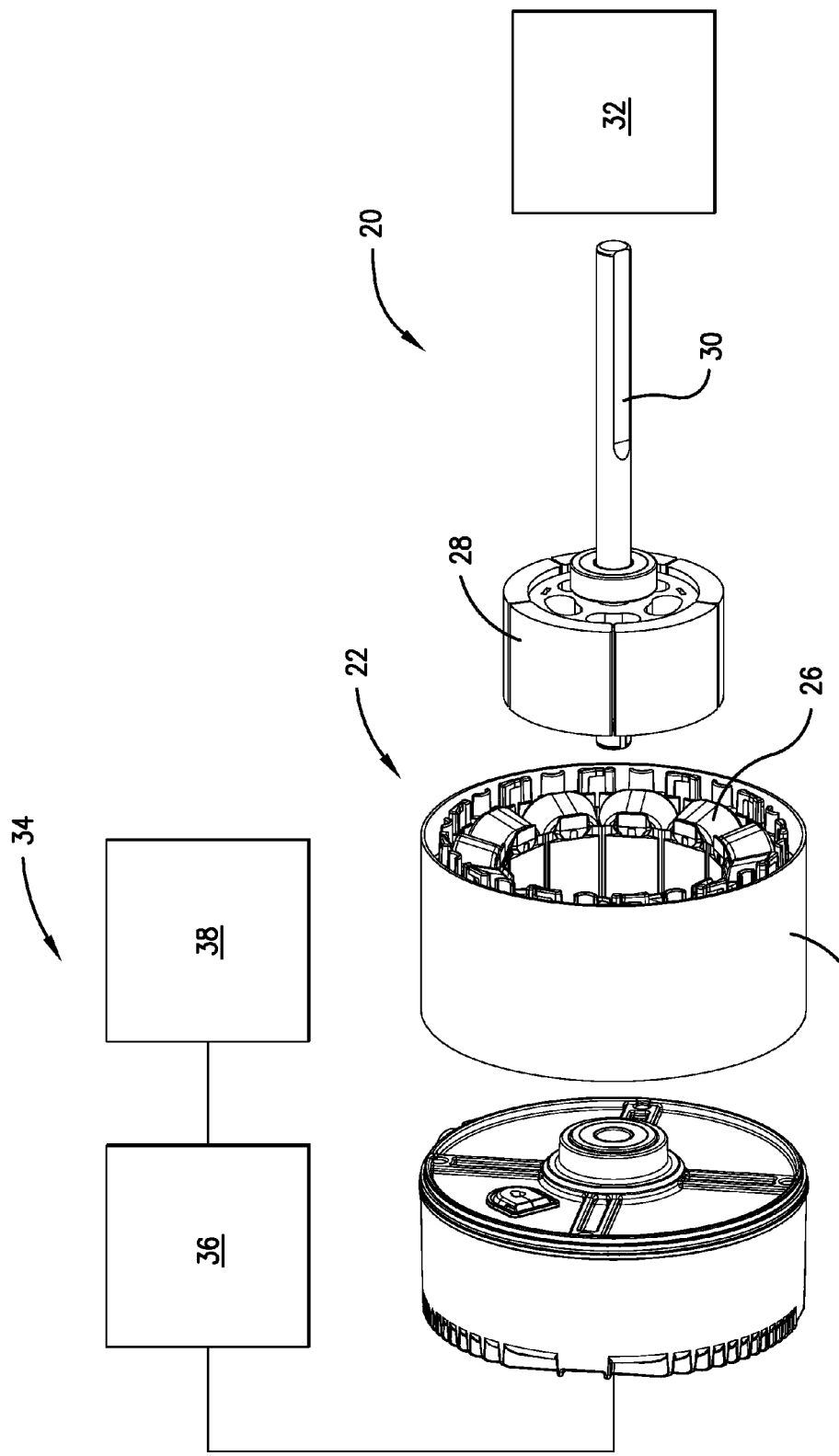
FIG. 1 is an exploded depiction of an embodiment of an electric motor system of the present invention, wherein the electric motor system is shown configured to drive a load.

Broadly characterized, the present invention provides a system and method for dynamically optimizing flux levels in electric motors based on estimated torque, and thereby improving efficiency, decreasing operating temperature, and increasing reliability. Referring to the FIG. 1, an embodiment of an electric motor system 20 is shown broadly including an electric motor 22 having a stator 24, a stator winding 26, a rotor 28, and a shaft 30 configured to drive a load 32, and a motor control subsystem 34 including an electronic control element 36 and an electronic memory element 38. The electric motor 22 may be a variable speed electric motor. For example, the electric motor 22 may be a multi-phase, multi-pole AC induction motor. The stator 24, stator winding 26, and rotor 28 may cooperate in an otherwise substantially conventional manner to turn the shaft 30 and thereby drive the load 32. The load 32 may be, e.g., a fan, a pump, a blower, a rotating drum, a component of a clothes washer or clothes dryer, a component of an oven, a component of a heating and air-conditioning unit, or a component of a residential or commercial machine.

The motor control subsystem 34 may be broadly configured to control operation of the electric motor 22. The various components of the motor control subsystem 34 may be implemented in hardware and/or software, and may be configured to receive input signals from a user interface and/or one or more sensors and to generate control signals based on such input to control operation of the electric motor 22. In one implementation, the motor control subsystem 34 may receive AC power from an AC power source, and may condition the AC power to drive the electric motor 22 in accordance with a speed command specifying a speed at which the electric motor 22 is to be run.

In particular, the control element 36 may be any suitable control technology configured to receive a power input, user commands, and/or sensor data, and based thereon control operation of the electric motor 22. The control element 36 may be in communication with the memory element 38. The memory element 38 may be any suitable non-transitory electronic or other memory technology configured to store data for subsequent access by the control element 36. In particular, the memory element 36 may store data and/or one or more computer programs used by the control element 36 in controlling operation of the electric motor 22.

A torque available at the shaft 30 is determined by the flux acting on the stator winding 26 and the distance of that force from the center of rotation. The flux is determined by $I_d$ flowing through the stator windings 26 and a strength of a plurality of field magnet components of the electric motor 22. More specifically, $$T = \frac{3}{2} \times pp \times \frac{L_m^2}{L_r} \times I_q \times I_d$$

where T=torque, pp=pole pairs, $L_m$=phase magnetizing inductance, $L_r$=rotor phase inductance, $I_d$=magnetizing current, and $I_q$=torque producing current. When excited by a given voltage and current, the electric motor 22 may exhibit a speed/torque curve. The load 32 on the shaft 30 causes the rotor 28 to slow, which creates slip. Thus, slip is the difference between the stator magnetic field speed and the rotor speed. A slip level associated with the knee of the V/F curve results in maximum torque and power transfer from the electric motor 22. Thus, this is normally the preferred place on the V/F curve to operate the electric motor 22. Vector control (or slip control) may be used to keep the electric motor 22 operating at this optimum point on the V/F curve. Vector control may be implemented by the motor control subsystem 34 using a mathematical model of the electric motor 22 stored in the memory element 38 and a position transducer (not shown) on the electric motor 22 to indicate a position of the rotor 28. The mathematical model allows the control element 36 to determine a speed/torque curve for the electric motor 22 given any applied voltage and frequency, which allows the motor control subsystem 34 to control the slip in the electric motor 22 to keep it operating at the knee of the speed/torque curve.

The present invention provides a software-based control solution which may be stored on the memory element 38 and executed by the control element 36 for dynamically optimizing flux levels based on estimated torque. Broadly, an upper flux limit and a lower flux limit for a given speed determine the flux range at that speed. The upper flux limit may be based on a rated torque at a given speed. The motor control subsystem's 34 hardware limits may reduce flux more when reaching a bus voltage limit and/or a bus current limit of the hardware. The lower flux limit may be based on a free shaft or lowest torque load level. Optimal flux may be determined by the torque resulting in the lowest phase current. The phase current may be sensed using shunts on each phase. Because estimated torque is a function of the phase current components, $I_d$ and $I_q$, optimal flux can be based on the electric motor's operating torque level. This update may occur slower than the several rotor time constants. This is an improvement over other methods that require the system to converge on the steady state value.

Figure 2:
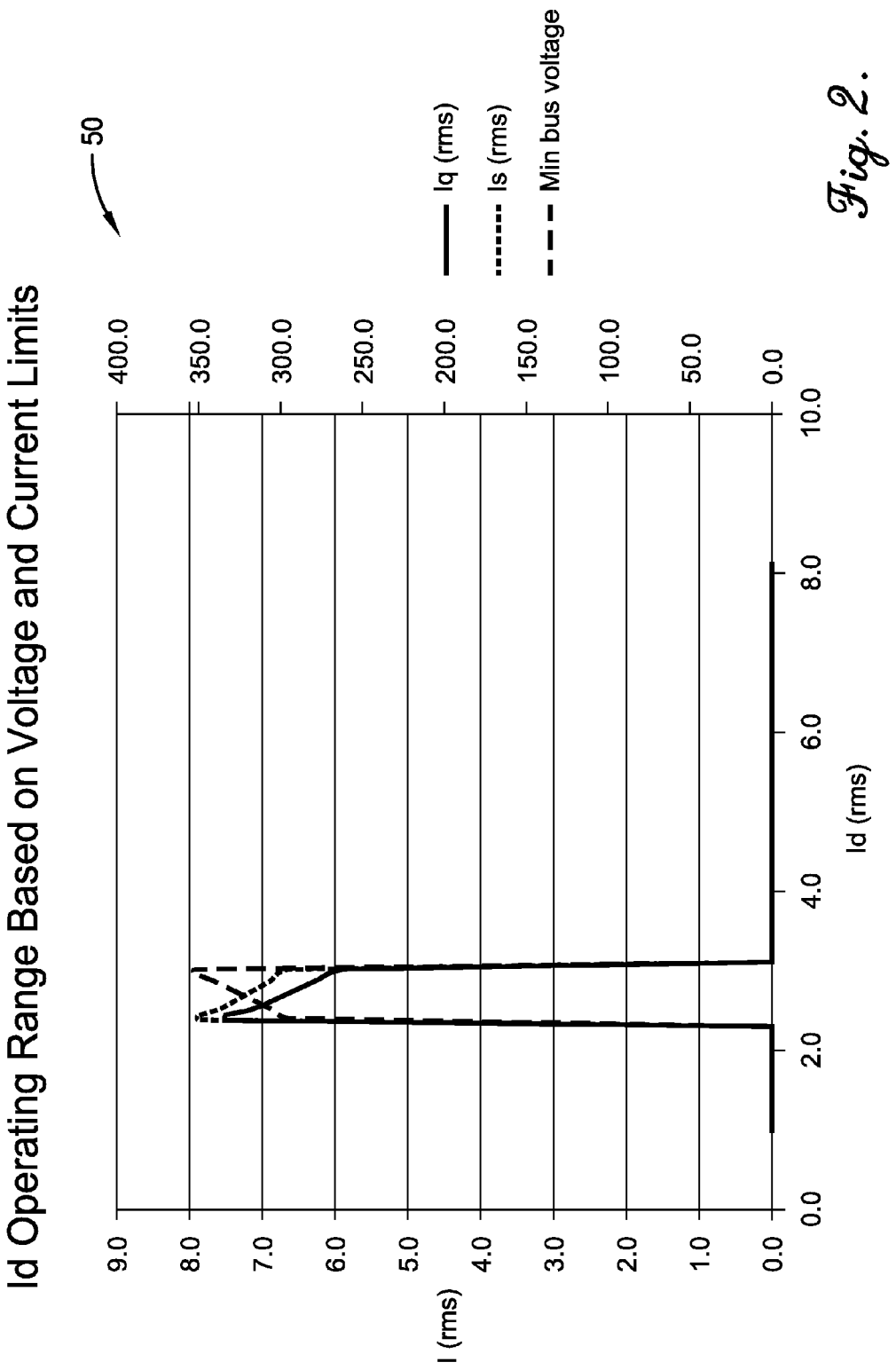
FIG. 2 is a plot if I versus $I_d$, and showing an operating range of $I_d$ based on voltage and current limits.
Figure 3:
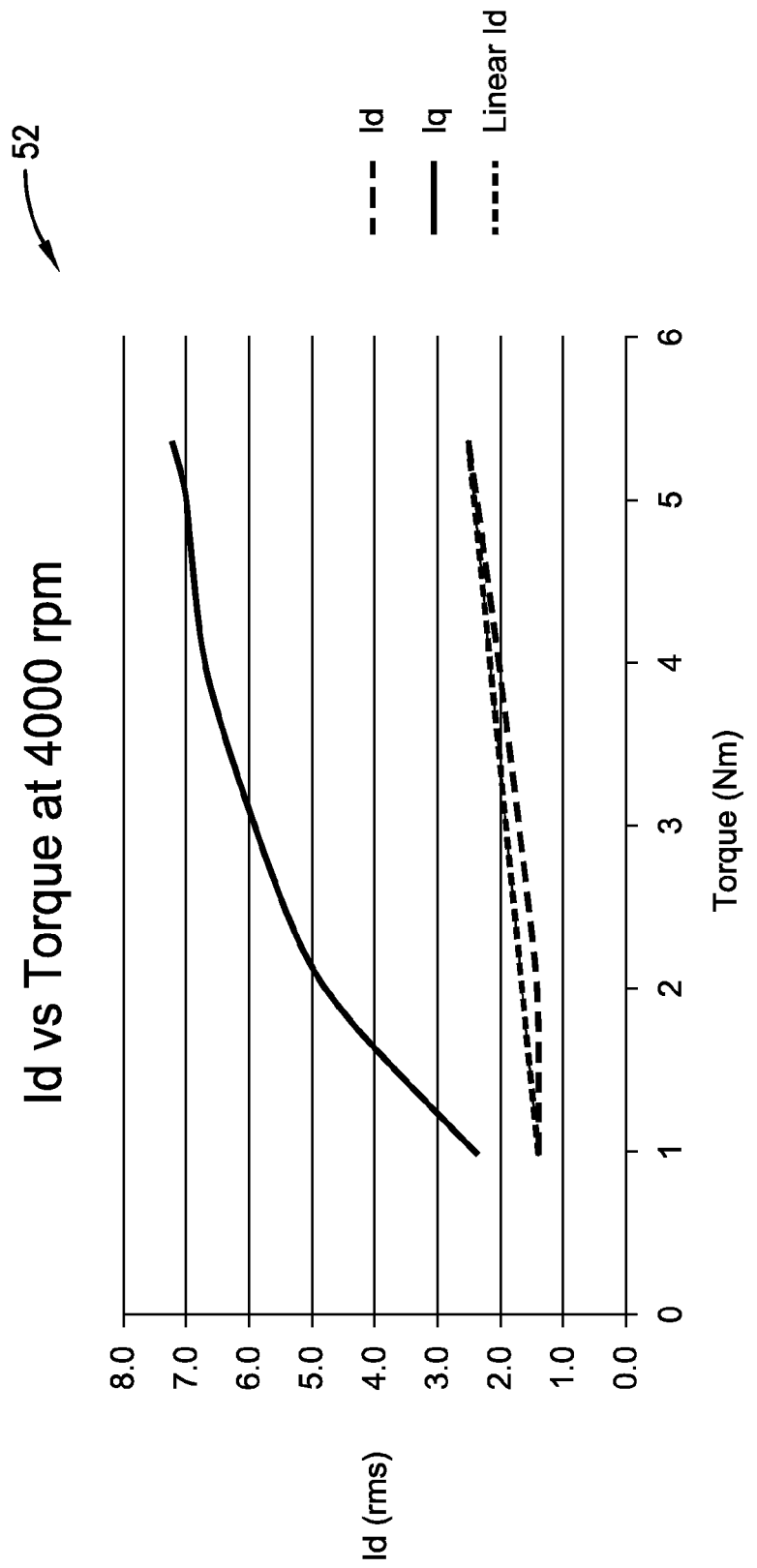
FIG. 3 is a plot of Id versus torque at 4000 revolutions per minute (rpm)
Figure 4:
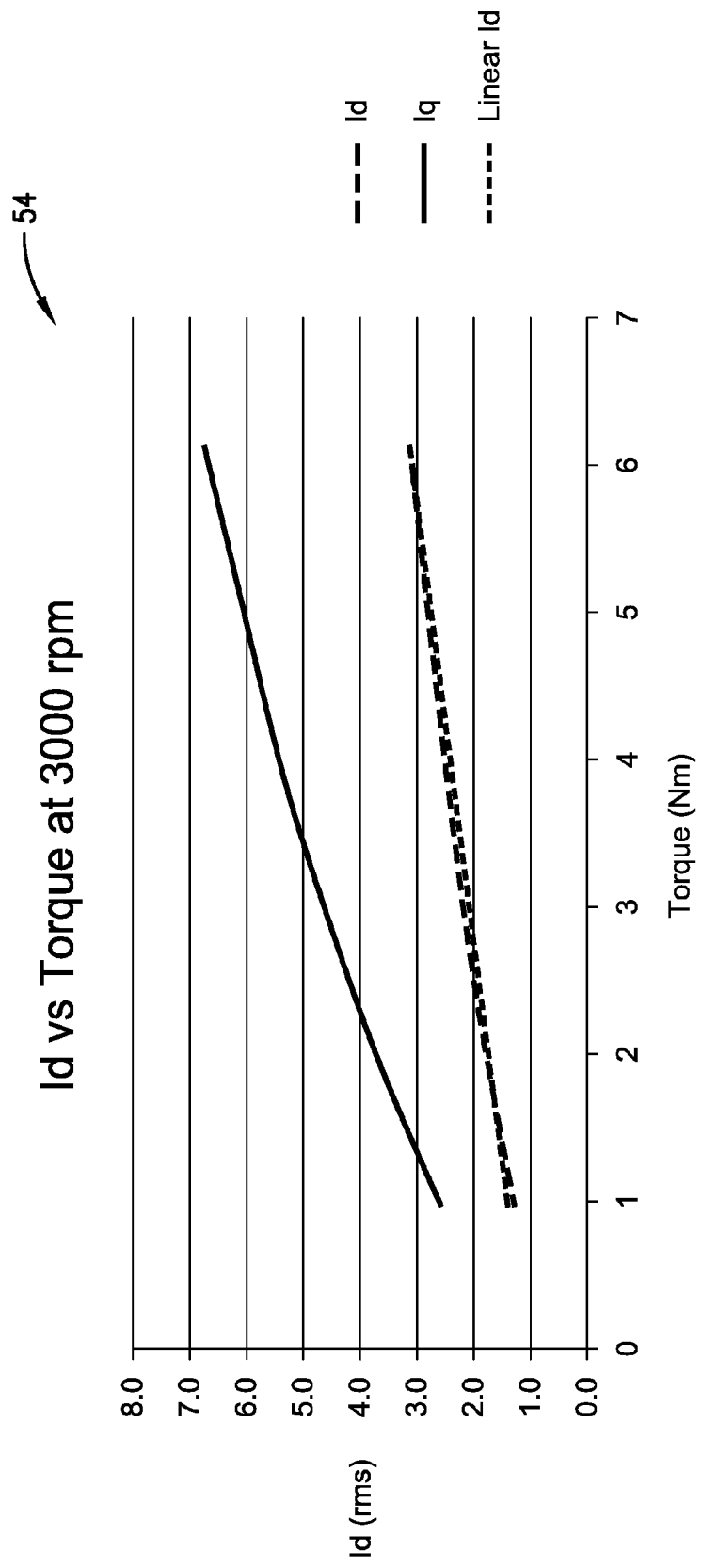
FIG. 4 is a plot of Id versus torque at 3000 rpm.
Figure 5:
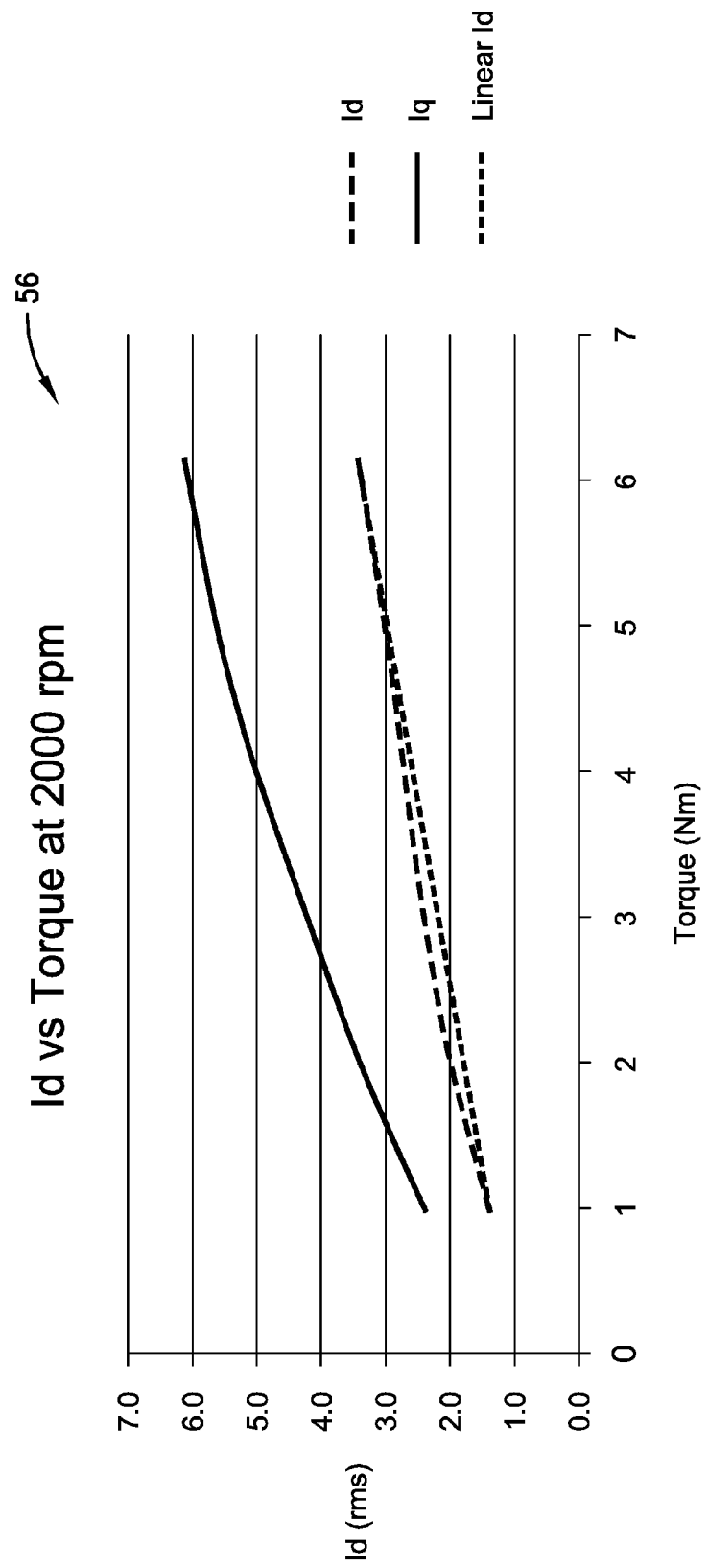
FIG. 5 is a plot of Id versus torque at 2000 rpm.
Figure 6:
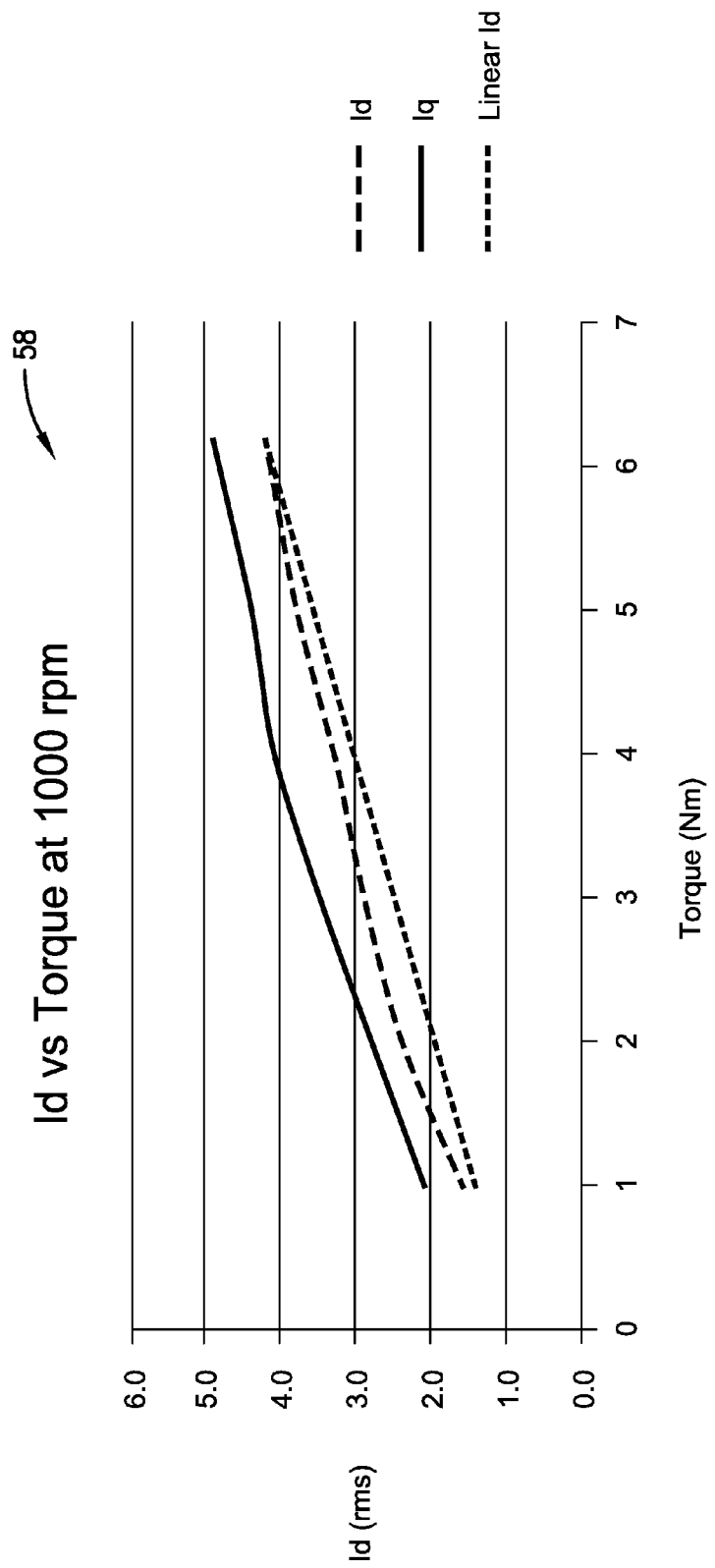
FIG. 6 is a plot of Id versus torque at 1000 rpm.
Figure 7:
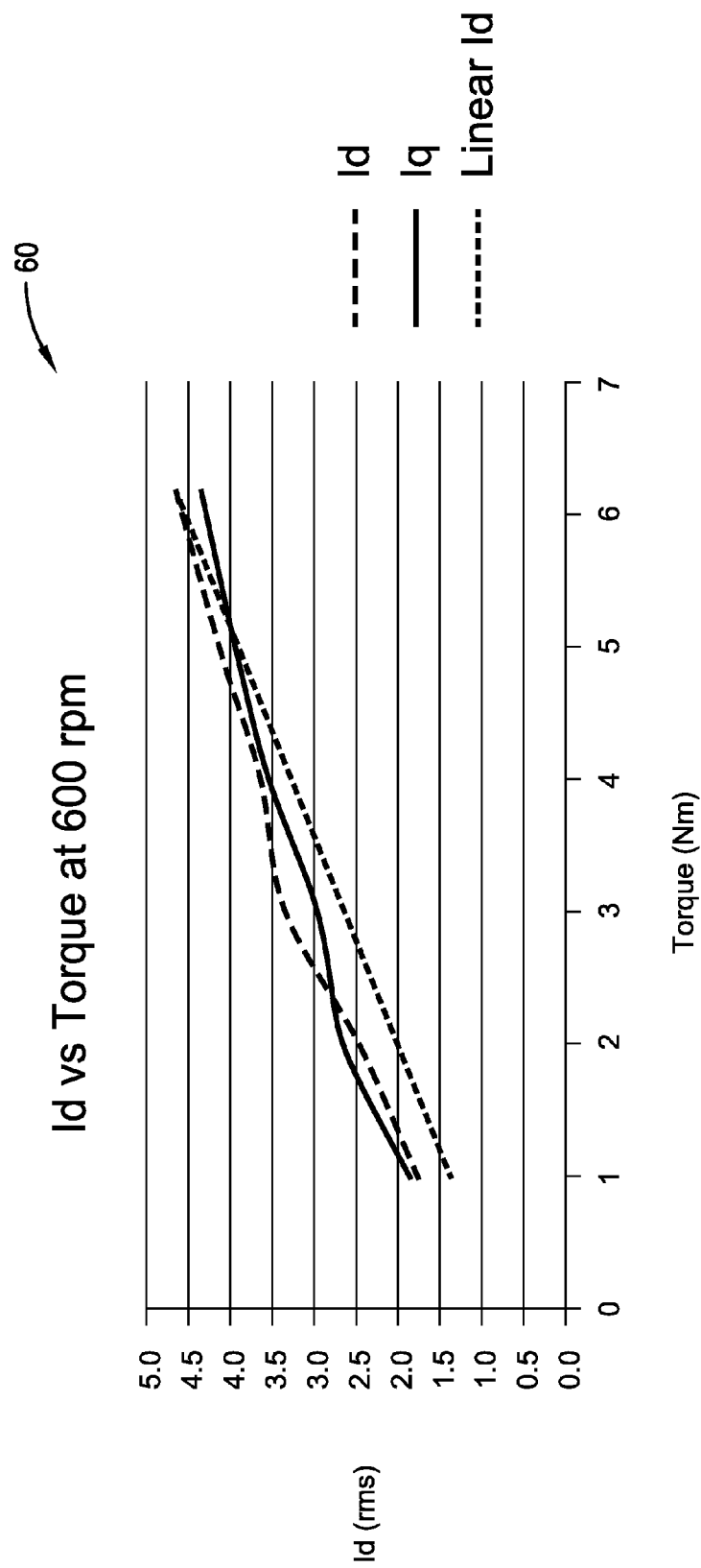
FIG. 7 is a plot of Id versus torque at 600 rpm.

In one implementation, the optimal flux may be determined by simulation by establishing the electric motor parameters in the slip, voltage, torque and power equations. More specifically, given a set of electric motor parameters associated with the electric motor 22, a set of electric motor equations may be used to estimate slip, stator frequency, torque, and power losses. These equations may be used to set the control current and voltage limit that shows the flux operating range (the $I_d$ range) at a given speed and torque. FIG. 2 shows an exemplary plot 50 of I versus $I_d$, and showing an operating range of $I_d$ based on given voltage and current limits for one speed/torque point. In this range, the lowest power level may be determined. Several speed points may be used to generate the optimal flux table. FIGS. 3-7 are exemplary plots 52,54,56,58,60 of optimal Id at each speed/torque point for 4000, 3000, 2000, 1000, and 600 rpm. respectively. The end result is a close to linear flux gain that is multiplied by the estimated torque to determine the target $I_d$ current representing the optimal flux. An exemplary table based on FIGS. 2-7, which may be stored in the memory element 38 and referred to by the control element 36 in controlling operation of the electric motor 22, and which may be set to the lowest power point for each target torque is shown below, in which $I_d$=(estimated torque×kslope)+koffset, wherein koffset=>$I_d$ at table's lowest torque point, and kslope=>$I_d$ slope over table torque range. In this example, koffset for all speed ranges set to 1.4.

| Target Flux Table | |
|---|---|
| Speed (rpm) | kslope |
| 4000 | 0.2533 |
| 3450 | 0.3100 |
| 3000 | 0.3293 |
| 2500 | 0.3293 |
| 2000 | 0.3874 |
| 1500 | 0.4262 |
| 1000 | 0.5424 |
| 600 | 0.6393 |

The control element 36 may use such a table of interpolated kslope values to determine optimal flux by, for a given speed, reading kslope from the table, multiplying the estimated torque by the interpolated kslope, and then adding the common koffset for the final $I_d$ current used to create the flux.

The set of electric motor parameters may be adjusted due to saturation and temperature. High currents will generally cause the inductance to decrease, so the inductance parameter may be set as a function of current. Resistance changes with temperature and becomes more of a problem at low speeds, so the resistance parameter may be set as a function of temperature.

In another implementation, the optimal flux may be determined iteratively, i.e., by converging the algorithm. More specifically, the torque equation may be used to determine the lowest $I_d$ and $I_q$ currents iteratively. Because speed regulators normally generate a torque command output, this torque command or estimated torque load can be used to determine the optimal flux. Many motor control drives now use vector control algorithms that independently control flux- and torque-producing currents. Flux is controlled based on Id current and torque is controlled based on $I_q$ current. The present invention involves setting the optimal Id current that results in optimal flux.

For stability reasons, the target flux may be regulated slower than the speed or torque regulators. It is assumed that the target flux is updated slower than the rotor time constant.

Referring also to FIG. 8 an embodiment of the method 100 of the present invention may proceed substantially as follows. A set of electric motor parameters may be adjusted based on the saturation of the electric motor 22 and/or the temperature of the electric motor 22, as shown in step 102. The set of electric motor parameters and the set of electric motor equations may be used to estimate such operating characteristics as a slip, a stator frequency, a torque, and a power loss and to set a current limit and a voltage limit which define an optimal flux operating range for a given speed and torque of the electric motor 22, as shown in step 104. The current limit may correspond to a lower flux limit based on a torque load level for a given speed of the electric motor 22, and the voltage limit may correspond to an upper flux limit based on the torque load level which results in a lower phase current torque component. A slope of a linear flux gain may be determined within the optimal flux operating range at a plurality of different speeds of the electric motor 22, as shown in step 106. The determined slope of the linear flux gain for each different speed may be saved in the memory element 38, as shown in step 108. The control element 36 may determine the optimal flux level for the electric motor 22 by accessing the memory element 38 to identify a specific slope of the linear flux gain which corresponds to an actual speed of the electric motor, 22, as shown in step 110, multiplying the slope of the linear flux gain by the estimated torque and adding an offset value to determine a phase current component value associated with the optimal flux level, as shown in step 112, and applying the determined phase current component value to the electric motor 22, as shown in step 114. The offset value may be a common offset value for the plurality of different speeds and is based on the phase current at a lowest torque point.

Thus, the present invention provides substantial advantages over the prior art, including that it dynamically optimizes flux levels in electric motors based on estimated torque, and thereby improving efficiency, decreasing operating temperature, and increasing reliability.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A method for optimizing a flux level in an electric motor configured to drive a load, the method comprising:
   using a set of motor parameters and a set of motor equations to estimate a slip, a stator frequency, a torque, and a power loss and to set a current limit and a voltage limit which define an optimal flux operating range for a given speed and torque of the electric motor,
   determining a slope of a linear flux gain within the optimal flux operating range at a plurality of different speeds of the electric motor;
   saving in an electronic memory element the slope of the linear flux gain for each different speed; and
   determining in an electronic control element an optimal flux level for the electric motor by— accessing the memory element to identify a specific slope of the linear flux gain which corresponds to an actual speed of the electric motor, multiplying the slope of the linear flux gain by the estimated torque and adding an offset value to determine a phase current component value associated with the optimal flux level, and applying the determined phase current component value to the electric motor.

2. The method as set forth in claim 1, wherein the electric motor is a variable speed, alternating current induction motor.

3. The method as set forth in claim 1, wherein the load is selected from the group consisting of: fans, pumps, blowers, rotating drums, components of clothes washers or clothes dryers, components of ovens, components of heating and air-conditioning units, and components of residential or commercial machines.

4. The method as set forth in claim 1, wherein— the current limit corresponds to a lower flux limit based on a torque load level for a given speed of the electric motor; and the voltage limit corresponds to an upper flux limit based on the torque load level which results in a lower phase current torque component.

5. The method as set forth in claim 1, wherein the motor equations include a slip equation, a voltage equation, a torque equation, and a power equation.

6. The method as set forth in claim 1, wherein the offset value is a common offset value for the plurality of different speeds and is based on the phase current at a lowest torque point.

7. The method as set forth in claim 1, wherein the optimal flux is determined by the torque resulting in a lowest power level.

8. The method as set forth in claim 1, further including adjusting the set of motor parameters based on a saturation of the electric motor.

9. The method as set forth in claim 1, further including adjusting the set of motor parameters based on a temperature of the electric motor.

10. A method for optimizing a flux level in an electric motor, wherein the electric motor is a variable speed, alternating current induction motor configured to drive a load, the method comprising:

using a set of motor parameters and a set of motor equations to estimate a slip, a stator frequency, a torque, and a power loss and to set a current limit and a voltage limit which define an optimal flux operating range for a given speed and torque of the electric motor;

determining a slope of a linear flux gain within the optimal flux operating range at a plurality of different speeds of the electric motor;

saving in an electronic memory element the slope of the linear flux gain for each different speed; and determining in an electronic control element an optimal flux level for the electric motor by— accessing the memory element to identify a specific slope of the linear flux gain which corresponds to an actual speed of the electric motor, multiplying the slope of the linear flux gain by the estimated torque and adding an offset value to determine a phase current component value associated with the optimal flux level, wherein the offset value is a common offset value for the plurality of different speeds and is based on the phase current at a lowest torque point, and applying the determined phase current component value to the electric motor.

11. The method as set forth in claim 10, wherein the load is selected from the group consisting of: fans, pumps, blowers, rotating drums, components of clothes washers or clothes dryers, components of ovens, components of heating and air-conditioning units, and components of residential or commercial machines.

12. The method as set forth in claim 10, wherein— the current limit corresponds to a lower flux limit based on a torque load level for a given speed of the electric motor; and the voltage limit corresponds to an upper flux limit based on the torque load level which results in a lower phase current torque component.

13. The method as set forth in claim 10, further including adjusting the set of motor parameters based on a saturation of the electric motor.

14. The method as set forth in claim 10, further including adjusting the set of motor parameters based on a temperature of the electric motor.

15. An electric motor system for optimizing a flux level in an electric motor configured to drive a load, the electric motor system comprising:

an electric motor having a shaft and configured to create a torque on the shaft to drive the load; and a motor control subsystem configured to control operation of the electric motor, the motor control subsystem including— an electronic memory element containing a table of slopes of a linear flux gain for a plurality of different speeds, wherein the table is created by— using a set of motor parameters and a set of motor equations to estimate a slip, a stator frequency, a torque, and a power loss and to set a current limit and a voltage limit which define an optimal flux operating range for a given speed and torque of the electric motor, determining a slope of a linear flux gain within the optimal flux operating range at a plurality of different speeds of the electric motor, and saving in the electronic memory element the slope of the linear flux gain for each different speed, and an electronic control element in communication with the memory element and configured to determine and achieve an optimal flux level for the electric motor by— accessing the memory element to identify a specific slope of the linear flux gain which corresponds to an actual speed of the electric motor, multiplying the slope of the linear flux gain by the estimated torque and adding an offset value to determine a phase current component value associated with the optimal flux level, and applying the determined phase current component value to the electric motor.

16. The system as set forth in claim 15, wherein the electric motor is a variable speed, alternating current induction motor.

17. The system as set forth in claim 15, wherein the load is selected from the group consisting of: fans, pumps, blowers, rotating drums, components of clothes washers or clothes dryers, components of ovens, components of heating and air-conditioning units, and components of residential or commercial machines.

18. The system as set forth in claim 15, wherein—
the current limit corresponds to a lower flux limit based on a torque load level for a given speed of the electric motor; and
the voltage limit corresponds to an upper flux limit based on the torque load level which results in a lower phase current torque component.

19. The system as set forth in claim 15, wherein the offset value is a common offset value for the plurality of different speeds and is based on the phase current at a lowest torque point.

20. The system as set forth in claim 15, wherein the electronic control element is further configured to—
adjust the set of motor parameters based on a saturation of the electric motor; and
adjust the set of motor parameters based on a temperature of the electric motor.

* * * * *